Dec. 29, 1931.  R. S. BERGMAN  1,838,653
ADJUSTABLE GLARE SHIELD FOR AUTOMOBILES
Filed May 2, 1929
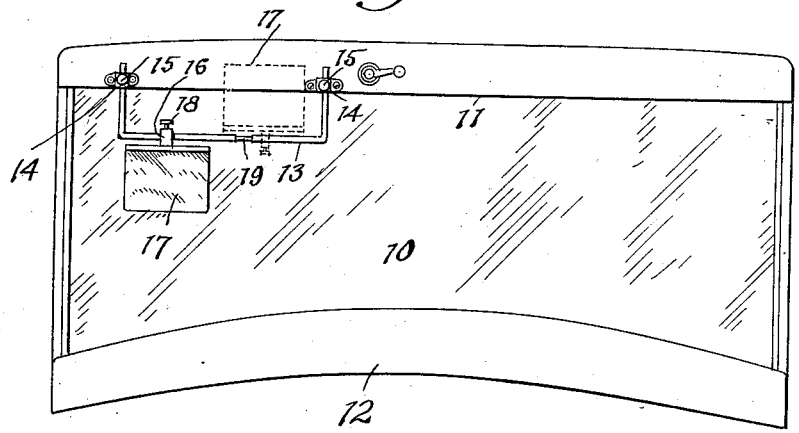
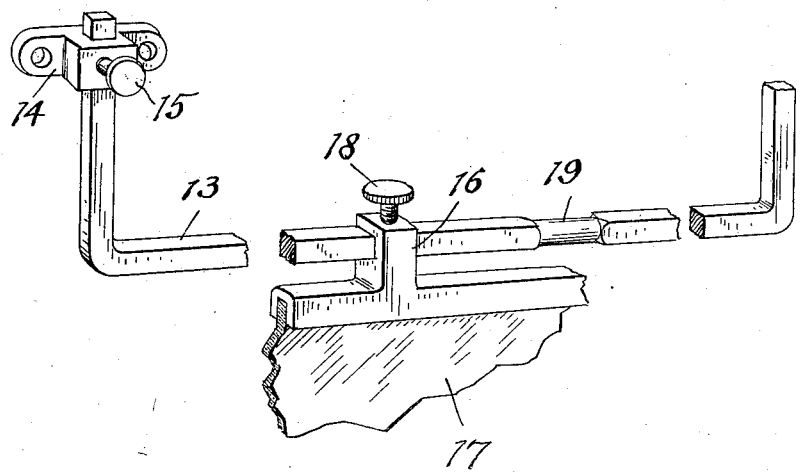

Patented Dec. 29, 1931

1,838,653

UNITED STATES PATENT OFFICE

RICHARD S. BERGMAN, OF CLEVELAND, OHIO

ADJUSTABLE GLARE SHIELD FOR AUTOMOBILES

Application filed May 2, 1929. Serial No. 359,811.

This invention relates to devices for shielding the driver or other occupant of an automobile from sun glare and also from the glare of the headlights of on-coming automobiles.

It is one of the objects of the invention to provide a device, for the purpose specified, that will be simple in construction, low in manufacturing cost, convenient to install and which will be adjustable so that the shield may be positioned to suit the requirements of different drivers and also different automobiles.

A further object is to provide a device of the character specified in which the shield may be conveniently adjusted or placed in a relatively inconspicuous and out-of-the-way position, when not in use.

Other objects of the invention and the features of novelty will be apparent from the following description taken in connection with the accompanying drawings, of which—

Fig. 1 is an elevation of a portion of an automobile with a device embodying my invention, shown in position, the windshield of the automobile being shown more or less diagrammatically; and Fig. 2 is a perspective view of the device shown in Fig. 1.

Referring to the drawings, 10 indicates the glass of a windshield and 11 the portion of the body that is above the glass 10. A portion of the dash is indicated at 12.

My improved device, as illustrated in the drawings, comprises a substantially U-shaped frame 13 that is preferably made from a rod of suitable metal, such as steel or brass, and bent into the shape shown, with the upright legs slidably arranged in brackets 14 which may be secured to the part 11 by screws or in any other suitable manner. The frame 13 is vertically adjustable in the brackets 14 and may be secured in any desired position by means of thumbscrews 15. The frame 13 is preferably made from a bar of square cross section but any other non-round cross section may be used.

On the horizontal portion of the frame 13 there is arranged a slidable member 16, which has an opening therethrough corresponding to the cross section of the frame, as best shown in Fig. 2, so that the member 16 may be secured in different positions, such as with the shield 17, which is carried by the member 16, either below the frame or above the frame or projecting horizontally therefrom toward the rear. A thumbscrew 18 is arranged in the member 16 for the purpose of securing the latter in any desired position.

The shield 17 may be of a suitably colored glass or celluloid or, in some cases, may be of opaque material.

A portion of the horizontal part of the frame 13 is reduced in cross section and preferably made round, as shown at 19, for the purpose of providing a place on the frame where the member 16 may be rotated to position the shield 17 either above or below the horizontal portion of the frame or projecting horizontally therefrom.

The usual position for the shield 17, when in use, is shown in Fig. 1 in full lines and when it is not desired to use the shield the screw 18 may be loosened and the member 16 moved along the horizontal portion of the frame 13 to the section 19 thereof, where the member 16 may be rotated to position the shield above the horizontal portion of the frame 13 as indicated in dotted lines in Fig. 1, this being the inoperative position of the shield. The screw 18 may then be tightened and the parts thus secured together so that they will not rattle. To return the shield to the operative position shown in full lines in Fig. 1, it is only necessary to loosen the screw 18, slide the member 16 along the horizontal portion of the frame 13, to the section 19, then lower the shield so that it will depend from the frame 13 and then move the member 16 to the left to the desired position, where the screw 18 may be again tightened. Vertical adjustments, to accommodate drivers of different heights, may be had by adjusting the frame 13 in the brackets 14.

Having thus described my invention, what I claim is:

In a device of the class described, the combination of a substantially U-shaped frame formed of rod having a rectangular cross-section and adapted to be arranged adjacent to and substantially parallel with a windshield, brackets secured above the windshield and having openings in which said frame is vertically adjustable, clamping screws on said brackets for securing said frame in the different positions to which it is adjustable, a member slidable along said frame and having a rectangular opening fitting the frame, said frame having a portion that is reduced in size to permit rotation of said member thereon, a shield carried by said member, and means for securing said member in different positions along said frame.

In testimony whereof, I hereunto affix my signature.

RICHARD S. BERGMAN.